US 6,545,215 B2

(12) United States Patent
Young et al.

(10) Patent No.: US 6,545,215 B2
(45) Date of Patent: Apr. 8, 2003

(54) SPLIT DOME COVER ASSEMBLY FOR AN IN-FLOOR FITTING

(75) Inventors: Joe Young, Reedsville, OH (US); Michael T. Cole, Parkersburg, WV (US); Stephen T. English, Williamstown, WV (US)

(73) Assignee: Walker Systems, Inc., Williamstown, WV (US)

( * ) Notice: Subject to any disclaimer, the term of this patent is extended or adjusted under 35 U.S.C. 154(b) by 0 days.

(21) Appl. No.: 10/054,298

(22) Filed: Jan. 22, 2002

(65) Prior Publication Data
US 2002/0096350 A1 Jul. 25, 2002

Related U.S. Application Data
(60) Provisional application No. 60/263,483, filed on Jan. 23, 2001.

(51) Int. Cl.[7] .................................................. H02G 3/04
(52) U.S. Cl. ............................ 174/48; 174/50; 174/53; 439/650; 52/220.8; 220/3.8
(58) Field of Search ........................... 174/48, 50, 53, 174/58; 439/650, 535, 536, 538; 52/220.8, 220.3, 220.5, 220.7

(56) References Cited
U.S. PATENT DOCUMENTS

| 2,672,749 A | 3/1954 | Wiesmann |
| 3,646,244 A | 2/1972 | Cole |
| 3,666,134 A | 5/1972 | Rauch |
| 3,830,954 A | 8/1974 | Caudill |
| 4,027,097 A | 5/1977 | Gillemot |
| 4,058,358 A | 11/1977 | Carlisle |
| 4,109,095 A | 8/1978 | Kling et al. |
| 4,197,959 A | 4/1980 | Kramer |
| 4,228,317 A | 10/1980 | Cziment |
| 4,289,921 A | 9/1981 | Gartner et al. |
| 4,342,493 A | 8/1982 | Grenell |
| 4,343,411 A | 8/1982 | Chesnut et al. |
| 4,458,460 A | 7/1984 | Kohaut |
| 4,541,538 A | 9/1985 | Swetnam |
| 4,640,564 A | 2/1987 | Hill |
| 4,711,634 A | 12/1987 | Antone, II et al. |
| 4,733,017 A | 3/1988 | Wolfe-Taylor et al. |
| 4,770,643 A | 9/1988 | Castellani et al. |
| 4,774,384 A | 9/1988 | Gregory |
| 4,793,818 A | 12/1988 | Poirier |

(List continued on next page.)

FOREIGN PATENT DOCUMENTS

JP 405304713 A 11/1993

*Primary Examiner*—Dean A. Reichard
*Assistant Examiner*—Dhiru R Patel
(74) *Attorney, Agent, or Firm*—McAndrews, Held & Malloy, Ltd.

(57) ABSTRACT

An access cover for an in-floor receptacle fitting includes a door mounting member connectable to the fitting at a location that overlies the receptacles carried by the fitting. A pair of access doors are slidably connected to the door mounting member for movement between closed positions at which the doors abut one another and overlie the at least one receptacle, and open positions at which the doors are laterally spaced from one another and the at least one receptacle is exposed. A seal member is adapted to seal against moisture infiltration between the access doors when the access doors are at their closed positions. The seal member may include a compressible seal carried by at least one of the access doors. Preferably the compressible seal members are carried by each of the access doors and are positioned to abut one another when the doors are at their closed positions. The compressible seals may be formed from a compressible polymer that is co-molded with the access doors. Alternatively, the seal member may include a magnetic seal member carried by at least one of the doors. Preferably, magnetic seal members are carried by each of the access doors and are positioned to engage with one another when the doors are at their closed positions.

40 Claims, 6 Drawing Sheets

U.S. PATENT DOCUMENTS

| | | |
|---|---|---|
| 4,81,833 A | 3/1989 | Meyers |
| 4,857,004 A | 8/1989 | Poirier |
| 4,874,906 A | 10/1989 | Shotey |
| 4,883,924 A | 11/1989 | Hadfield |
| 4,952,754 A | 8/1990 | Rye |
| 4,952,756 A | 8/1990 | Meyers |
| 5,017,153 A | 5/1991 | Bowman |
| 5,030,795 A | 7/1991 | Domigan |
| 5,032,690 A | 7/1991 | Bloom |
| 5,041,698 A | 8/1991 | Takagi et al. |
| 5,107,075 A | 4/1992 | Currier, Jr. |
| 5,148,348 A | 9/1992 | White |
| 5,160,808 A | 11/1992 | Hadfield |
| 5,240,426 A | 8/1993 | Barla |
| 5,272,278 A | 12/1993 | Wuertz |
| 5,288,945 A | 2/1994 | Bruce |
| 5,306,178 A | 4/1994 | Huang |
| 5,563,373 A | 10/1996 | Doroslovac |
| 5,571,023 A | 11/1996 | Anthony |
| 5,588,853 A | 12/1996 | Anthony |
| 5,727,958 A | 3/1998 | Chen |
| 5,743,752 A | 4/1998 | Massebeuf |
| 5,866,845 A | 2/1999 | Markiewicz et al. |
| 5,998,735 A | 12/1999 | Patterson, Jr. |
| 6,018,126 A | 1/2000 | Castellani et al. |
| 6,114,623 A | 9/2000 | Bonilla et al. |
| 6,132,227 A | 10/2000 | Boteler et al. |
| 6,175,078 B1 | 1/2001 | Bambardekar et al. |
| 6,179,634 B1 | 1/2001 | Hull et al. |
| 6,265,662 B1 | 7/2001 | Riedy et al. |
| 6,307,152 B1 * | 10/2001 | Bonilla et al. ............ 174/48 |
| 6,353,180 B1 * | 3/2002 | DeBartolo, Jr. et al. ...... 174/48 |
| 6,417,446 B1 * | 7/2002 | Whitehead ............ 174/48 |

* cited by examiner

US 6,545,215 B2

SPLIT DOME COVER ASSEMBLY FOR AN IN-FLOOR FITTING

RELATED APPLICATIONS

This application claims priority of Provisional Application Serial No. 60/263,483, which was filed on Jan. 23, 2001.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In-floor fittings such as poke-thru fittings, aftersets fittings and preset fittings are installed in concrete floors to provide electrical receptacles and communication/data receptacles (or jacks) at desired locations in buildings. The receptacles carried by these fittings are typically mounted at or near the surface of the floor. As a result, such fittings may be exposed to contaminants such as dirt, e.g., from foot traffic, and water, e.g. during carpet cleaning. Hence, it is desirable that such fittings are designed to prevent moisture infiltration from above the floor. In this respect, Underwriters Laboratories (UL) is proposing certification standards which will require such fittings to keep scrub water out of the portion of the fitting that houses the electrical outlet, e.g. the power portion. Scrub water is a soap and water mixture that is typically used when cleaning carpets and other finished floor surfaces.

BRIEF SUMMARY OF THE INVENTION

According to certain aspects of an embodiment of the present invention, an access cover is provided for a fitting of the type which adapted to be mounted in a floor for supporting at least one receptacle such that the receptacle can be connected with cables which enter the fitting from below the surface of the floor and can be connected from above the floor with a connector which enters the fitting through an opening in the surface of the floor. The access cover includes a door mounting member connectable to the fitting at a location that overlies the at least one receptacle. An access door is slidably connected to the door mounting member for movement between a closed position at which door overlies the at least one receptacle and an open position at which the at least one receptacle is exposed. A mating surface is positioned to abut with the access door when the access door is moved to its closed position. A seal member is positioned to be compressed between the access door and the mating surface when the access door is moved to its closed position for sealing against moisture infiltration between the access door and the mating surface. The mating surface may, for example, be defined by a second access door or may be defined by another portion of the access cover.

According to other aspects of an embodiment of the present invention, an access cover is provided for a fitting of the type which adapted to be mounted in a floor for supporting at least one receptacle such that the receptacle can be connected with cables which enter the fitting from below the surface of the floor and can be connected from above the floor with a connector which enters the fitting through an opening in the surface of the floor. The access cover includes a door mounting member connectable to the fitting at a location that overlies the at least one receptacle. A pair of access door are slidably connected to the door mounting member for movement between closed positions at which the doors abut one another and overlie the at least one receptacle and open positions at which the doors are laterally spaced from one another and the at least one receptacle is exposed. A seal member is adapted to seal against moisture infiltration between the access doors when the access doors are at their closed positions.

In one embodiment, the seal member includes a compressible seal carried by at least one of the access doors. Preferably the compressible seal member includes a pair of compressible seals, each of which is carried by one of the access doors. The compressible seals are positioned to abut one another when the doors are at their closed positions so as to seal against moisture infiltration between the doors. The compressible seals may be formed from a compressible polymer that is co-molded with the access doors.

In another embodiment, the seal member may include a magnetic seal member carried by at least one of the doors. Preferably the magnetic seal member includes first and second magnetic seal members, each of which is carried by one of the access doors. The magnetic seal members are positioned on the access doors to magnetically engage with one another when the doors are at their closed position so as to seal between the access doors.

The access member may include a mounting bracket interposed between the fitting and the cover plate. The mounting bracket is configured to support at least one receptacle within the fitting such that the receptacle can be interconnected with a source cable within the inner compartment and can be interconnected from above the floor with a connector.

The mounting bracket may include an upwardly extending annular flange defining a water dam around the at least one receptacle. The annular flange may also define a recess for receiving the door mounting member.

A second seal member may be interposed between the mounting bracket and the floor. The second seal member may be in the form of at least one annular gasket which is adapted to be compressed between the floor and the mounting bracket to seal against water infiltration between the mounting bracket and the floor.

DETAILED DESCRIPTION OF THE INVENTION

Figure 1:
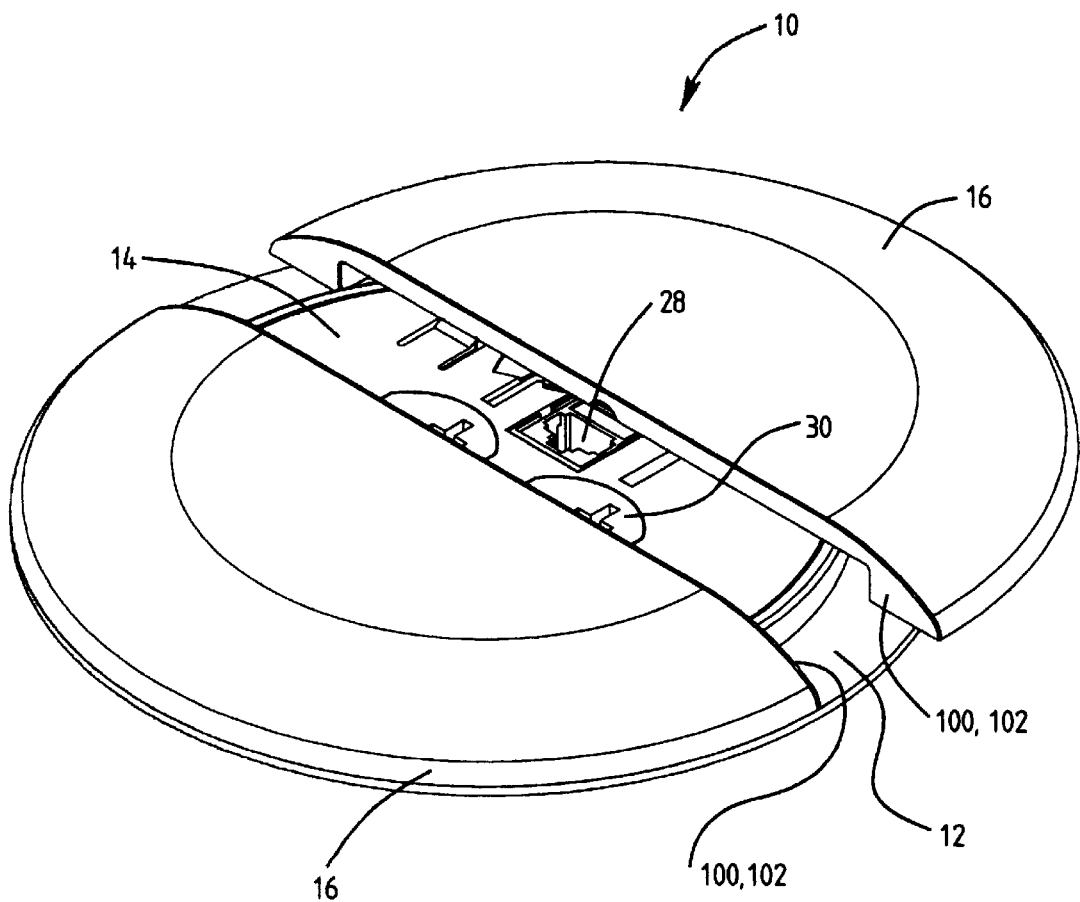
FIG. 1 is a perspective view a cover assembly according to certain aspects of an embodiment the present invention.
Figure 2:
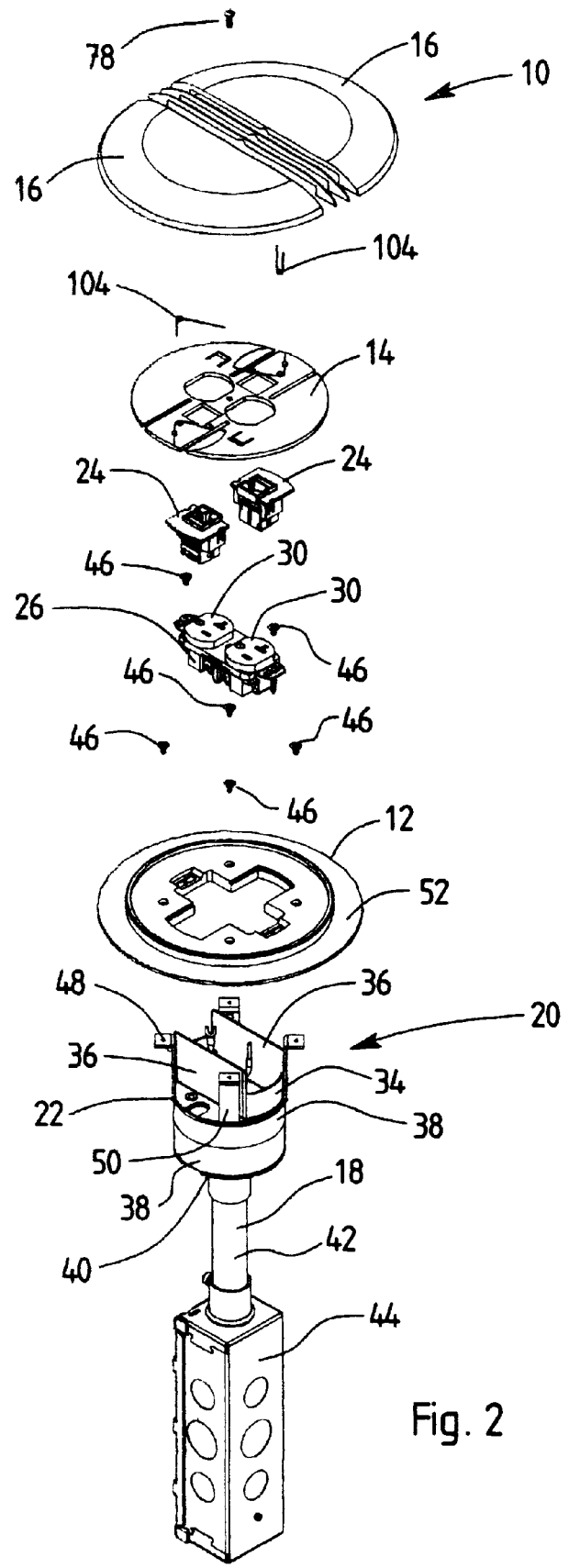
FIG. 2 is an exploded perspective view of the cover assembly of FIG. 1, in combination with a poke-thru fitting.

Referring to the drawings, a cover assembly 10 according to certain aspects of an embodiment of the present invention generally includes a bottom member 12, which may be in the form of a trim flange, an access door mounting member 14, which may be in the form of a cover plate, and a pair of access doors 16. The cover assembly 10 is configured to be mounted over an in-floor fitting, such as a poke-thru fitting, for selectively covering and exposing receptacles carried by the fitting.

In the illustrated embodiment, the cover assembly 10 is described in connection with a poke-thru fitting of the type which is adapted to be mounted in a cored opening in concrete floor. It will be appreciated, however, that the cover assembly 10 could readily be adapted for use with other types of in-floor fittings, such as preset or afterset fittings as are used with in-floor raceway systems. The poke-thru fitting may be constructed generally in accordance with the poke-thru fittings disclosed in U.S. Pat. No. 6,018,126, which issued Jan. 25, 2000 and is entitled "Flush Poke-Through Wiring Fitting" (the "'126 patent"), and in U.S. Pat. No. 6,175,078, which issued Jan. 16, 2001 and is entitled "Flush Poke-Through Wiring Fitting Having A Height Adjustable Data Jack Mounting Bracket" (the "'078 patent"). The disclosures of the '126 and '078 patents are hereby incorporated by reference.

As is described in greater detail in the '126 and '078 patents, the poke-thru fitting is constructed for mounting in a fire-rated floor of a building, such as a commercial office building. More specifically, the fitting 18 may be installed in a circular opening formed in floor to activate a desired floor location. In this respect, the fitting is typically installed in a cored hole in a concrete floor. The fitting is adapted to be activated by connecting source power service and communication/data signal service cables, which are otherwise disposed in the plenum below the floor, to fittings such as power receptacles and communication/data receptacles, respectively, mounted in the poke-through fitting. This enables above-floor power plugs and signal transferring devices to be connected to the poke-thru fitting and to thus transfer power and communication/data signals to equipment located on or above the floor. The cover assembly is configured to mate with the top of the poke-thru The poke-thru fitting 18 includes an insert 20, which is adapted to be installed in a floor opening. When installed, the insert 20 includes an upper, generally cylindrical chamber or compartment, which is defined at the insert's upper end by the bottom member 12 of the cover assembly 10 and at its lower end by a horizontally disposed middle plate 22.

The fitting is configured to support a plurality of communication/data receptacles 24 that are adapted to be activated within the fitting 10 by communication/data signal cables (not shown). Terminals 28 in the upper faces of the communications/data receptacles 24 are accessible through access openings 29 located in the access door mounting member 14. The fitting also supports at least one power receptacle 26 that is adapted to be activated within the fitting 10 by source power cables (not shown). Outlets 30 in the upper face of the receptacle 26 are accessible through access openings 32 located in the access door mounting member 14.

As is explained in greater detail in the '078 and '126 patents, a receptacle barrier 34 divides the upper chamber into a central space or portion, in which power receptacle 26 is disposed, and a pair of radially outer, semi-annular or side spaces or portions in which communication/data receptacles 24 are disposed. The receptacle barrier 34 physically separates and electrically isolates the connection between the power receptacle 26 and the power cables from the connection between the communication/data receptacles 24 and the communication/data cables, so as to shield the communication/data cables, and their associated receptacles, from E.M.I. and/or R.F.I. emanating from the power cables. The receptacle barrier 34 includes a pair of side walls 36 that extend across the upper chamber like chords and serve to divide the central space from the side spaces. The receptacle barrier 34 shields the central space, where the high-voltage power cables are connected to the power receptacles 26, from the side spaces, where the communication/data cables are connected to the communication/data receptacles 24.

It will be appreciated that the number and mounting locations of the receptacles 24, 26 within the fitting 10 can be varied without departing from the scope of the appended claims. For example, the communications/data receptacles 24 could be mounted in the central space and the power receptacles 26 could be mounted in the side spaces of the upper compartment. Such an arrangement is generally shown and described in U.S. patent application Ser. No. 09/642,951, which was filed on Aug. 21, 2000 and is entitled "Quad Receptacle, Dual Circuit Flush Poke-Through Wiring Fitting With Internally Mountable Communication/Data Jacks," (the "'951 application"), the disclosures of which is hereby incorporated by reference.

The insert 20 further includes a fire stopping elements 38 as known in the art. Suitable fire stopping elements are disclosed in the '126 patent. As is shown and described in the '126 patent, the fire stopping elements 38 define raceways through which the power cables and communication/data cables are extendable between the plenum and the upper chamber of the insert 20. The fire stopping elements 38 are supported in the fitting 18 between the middle plate 22 and a bottom plate 40. The middle and bottom plates 22, 40 have openings that align with the raceways and in the fire stopping elements 38 to permit wires to pass between the plenum and the upper chamber of the insert 20.

The upper end of a conventional electrical metalized tubing connector 42 may be connected to the bottom plate 40 for securing a conduit system thereto and for improving grounding capability. A conventional junction box 44 may be connected to the lower end of the EMT connector 42, as is well known in the art.

The cover assembly 10 is connected with the upper end of the fitting 18 and aligns with and overlies the floor opening (not shown) in which the fitting 18 is mounted. As was discussed above, the cover assembly 10 includes bottom member 12, an access door mounting member 14, and a pair of access doors 16. The bottom member, door mounting member and access doors may all be formed, e.g. molded, from a suitable polymeric material, such as polyvinylchloride (PVC). Alternatively, the bottom member may be formed from a metallic member, such as brass.

In the illustrated embodiment, the bottom member 12 is in the form of a trim ring, which is adapted to be secured to the fitting 18 and to support the receptacles 24, 26 within the fitting. The bottom member 12 is secured to the fitting 18 by fasteners 46 that extend through the fitting and thread into reciprocal apertures 48 in the fitting. The apertures 48 are carried by legs 50 that extend upwardly from the middle plate 22 of the fitting.

The bottom member 12 is generally circular and includes an annular flange 52. The annular flange 52 extends around the perimeter of the bottom member 12 and overlies the surface of the floor around the fitting 18.

The bottom member 12 may be configured to function as a mounting bracket for the receptacles 24, 26. Alternatively, the fitting 18 may include mounting brackets (not shown) for supporting the receptacles 24, 26. In such designs, the bottom member 12 may be formed integrally with the access door mounting member 14.

In the illustrated embodiment, the bottom member 12 includes a central opening 56 that overlies the fitting 18 and is configured to support the receptacles 24, 26 within the upper chamber of the fitting 18. The central opening 56 is defined by a central portion 58 that overlies the central space of the upper chamber and two side portions 60 that overly the side spaces of the upper chamber. It will be appreciated that the portions 58, 60 of the central opening 56 could also be formed by three separate openings.

The central portion 58 of the central opening 56 is sized to receive and support the power receptacle 26. The power receptacle 26 may be in the form of a duplex receptacle which carries a pair of conventional electrical outlets 30 in its upper face. The outlets 30 present blade openings which are oriented for receiving a conventional male electrical plug (not shown). Fasteners 61 extend through mounting flanges 62 on the ends of the receptacle 26 and thread into threaded openings 64 in the bottom member 12 for securing the power receptacle 26 to the bottom member 12. It will be appreciated, however, that the power receptacle 26 could take numerous other forms without departing from the scope of the claimed invention. For example, the housing of the receptacle can be equipped with locking fingers to allow it to snap mount into the bottom member 12. Alternatively, the power receptacle 26 may be in the form of a pair of simplex power receptacles (not shown) carried by a mounting bracket (not shown). Suitable simplex receptacles are shown in the aforementioned '951 application, and they are also used in the Model RC4 Poke-Thru Fitting as sold by Walker Systems, Inc. Each of the simplex receptacles has a generally square housing, which presents a pair of locking tabs which allow the receptacles to snap mount into the mounting bracket. The mounting bracket similarly includes locking tabs which allow it to snap mount in the bottom member.

Each of the side portions 60 of the central opening 56 is configured to support at least one communication/data receptacle 24. The communication/data receptacles 24 are carried by mounting brackets 68, which may be separately or integrally formed with the receptacles 24. Each mounting bracket 68 is adapted to be mounted within one of the side portions 60 of opening 56.

The mounting bracket 68 includes locking fingers 70 for securing the mounting bracket within the side portion 60 of the central opening 56. As the mounting bracket 68 is inserted downwardly into the central opening 56, the lower edges of the locking fingers 70 engage against the edges of the opening 56. Continued downward pressure on the mounting bracket 68 biases the fingers 70 inwardly, thereby permitting the mounting bracket 68 to move downwardly into the opening 56. The lower edges of the locking fingers 70 are beveled to ease insertion of the mounting bracket 68 into the central opening 56. Once the upper edges of the locking fingers 70 extend past the lower face of the bottom member 12, the locking fingers spring outwardly to lock the mounting bracket 68 in place.

It will be appreciated that the mounting bracket 68 may take many other forms without departing from the scope of the appended claims. For example, the mounting bracket may be in the form of a height-adjustable mounting bracket, as is disclosed in the aforementioned '078 patent. Alternatively, as is shown in the '126 patent, the mounting bracket may be in the form of a plate which is configured to mount in the bottom member 12 and support at least one communication/data receptacle. Moreover, it will be appreciated that the power receptacle 26 and/or the communication/data receptacles 24 could be mounted directly in the fitting 18, as opposed to being mounted in the bottom member 12 of the cover assembly 10. In such a configuration, the bottom member 12 would include aperture(s) to provide access to the receptacles 24, 26 from above the floor.

The access door mounting member 14 is generally circular and is sized to fit in a generally annular recess 74 formed in the top face of the bottom member 12. The annular recess 74 may be defined by an annular wall 76 that extends upwardly from the top face of the bottom member 12. The annular wall 76 extends around the perimeter of the central opening 56, and hence the receptacles 24, 26, to define a water dam around the receptacles.

Figure 3:
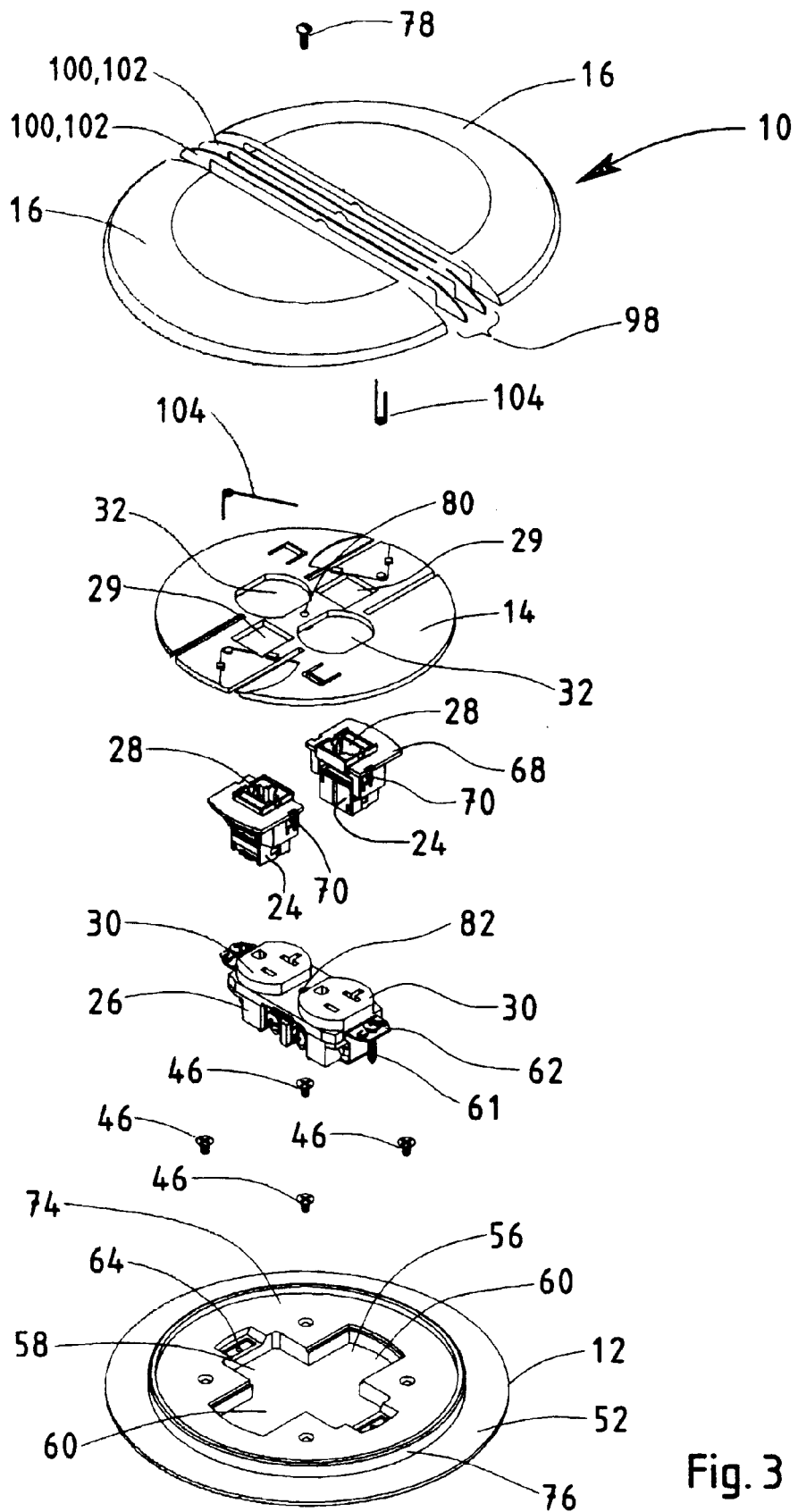
FIG. 3 is an exploded perspective view of the cover assembly of FIG. 1.

The door mounting member 14 is secured in place by a fastener 78 that extends through an opening 80 in the door mounting member and threads into a reciprocal opening 82 in the power receptacle 26. (See FIG. 3). Alternatively, the door mounting member 14 could be secured directly to the bottom member 12 by fasteners or snap fingers, for example.

The door mounting member 14 includes a plurality of access openings 29, 32 that align with the receptacles to provide access to the receptacles from above. In the illustrated embodiment, separate openings are provided for each of the receptacles 24, 26. It will be appreciated, however, that a single large opening could extend over all of the receptacles.

Figure 4:
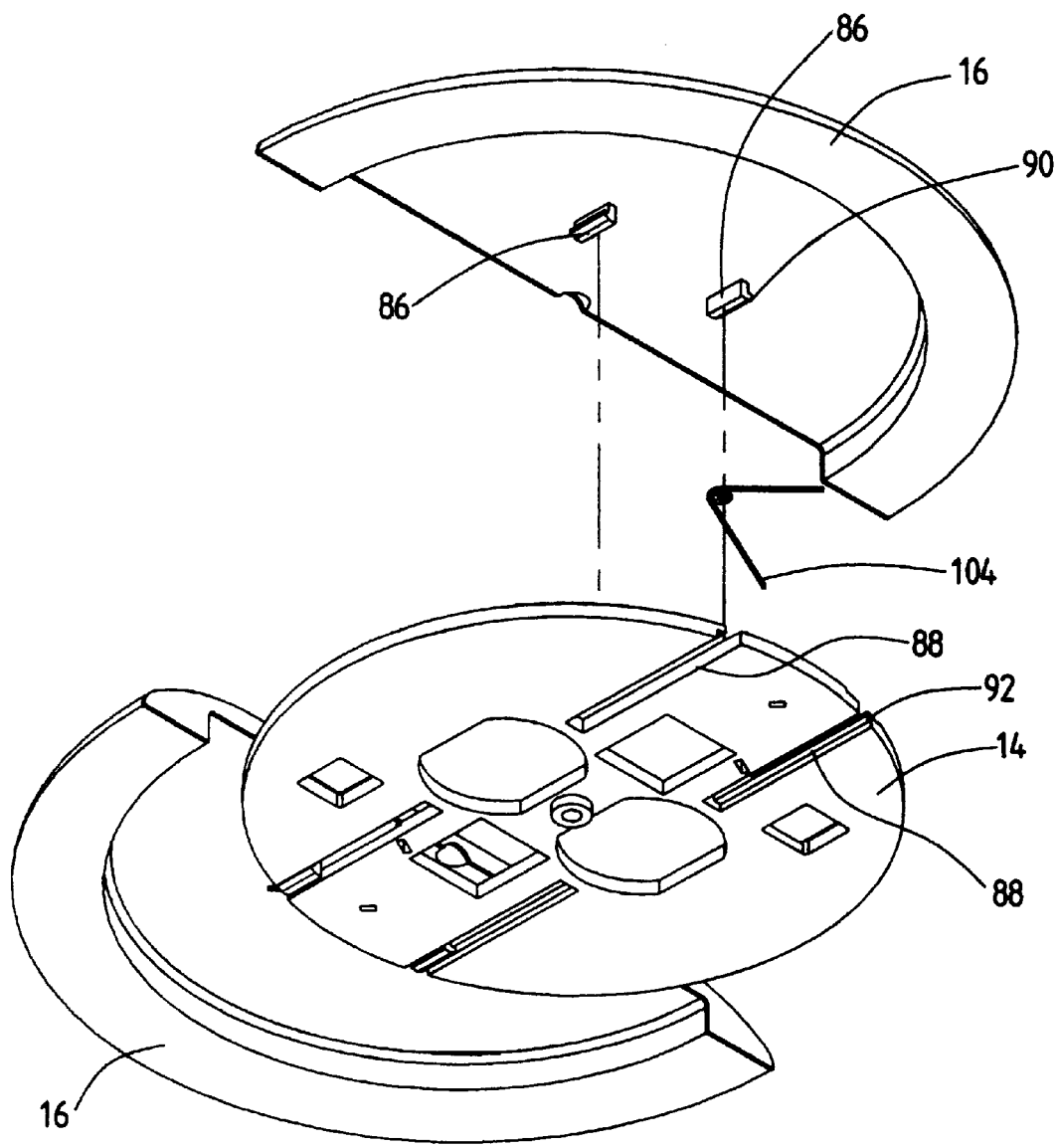
FIG. 4 is a partial exploded bottom view showing the interface between the access doors and the access door mounting member.
Figure 5:
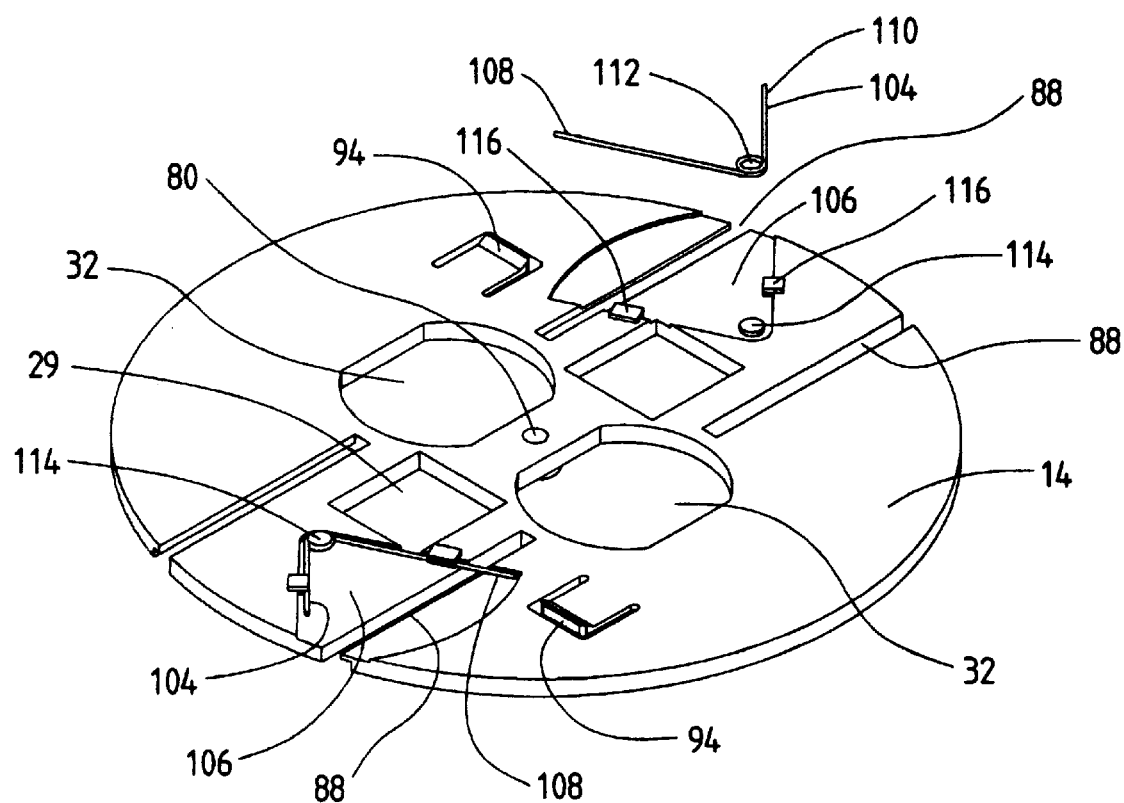
FIG. 5 is a top perspective view of the access door mounting member.
Figure 6:
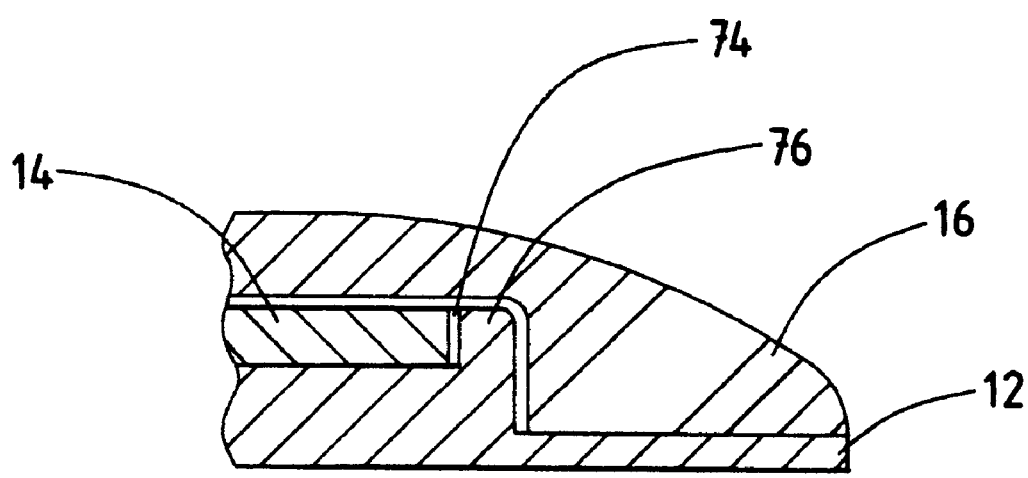
FIG. 6 is a partial cross-sectional view of FIG. 1.

The access doors 16 are preferably dome-shaped to assist in diverting water away from the access cover assembly 10. The access doors 16 are slidably secured to the door mounting member 14 for selectively covering and exposing the receptacles 24, 26. In particular, the doors are configured to slide between an inner or closed position (see, e.g., the lower left door in FIG. 1) at which they overlie the receptacles 24, 26 and an outer or open position (see, e.g., upper right door in FIG. 1) at which the receptacles are exposed. For this purpose, each access door 16 includes at least one finger 86 extending from its bottom wall. (See FIG. 4). In the illustrated embodiment, each door 16 includes a pair of fingers 86. The fingers 86 slidably engage with reciprocal runner slots 88 formed in the door mounting member 14 to permit the access doors 16 to move between their open and closed position. The fingers 86 include tabs or flanges 90 on their lower ends. The tabs 90 underlie reciprocal flanges 92 on the edges of the runner slots 88 to retain the doors 16 with the runner slots 88. The annular wall 76 on the bottom member 12 serves as a positive stop to limit outward movement of the access doors 16 in the runner slots 88. In particular, as the access doors 16 move outwardly, the fingers 86 on the bottoms of the doors abut against the inner face of the annular wall 76 to limit outward movement of the doors and to prevent the fingers from sliding laterally out of the runner slots 88.

Locking fingers 94 formed in the top face of the door mounting member 14 are provided for retaining the access doors 16 in their opening position. As the doors 16 slide outwardly past the locking fingers 94, the fingers spring upwardly and engage against the inner edges of the doors to retain them in their open positions. The locking fingers 94 can be depressed to allow the access doors 16 to be returned to their closed position.

A seal member 98 is adapted to seal against moisture infiltration between the access doors 16 when the access doors are at their closed positions. In one embodiment, the seal member 98 includes a compressible seal 100 carried by at least one of the access doors. Preferably each of the doors 16 carries a compressible seal/member 100. The compressible seals 100 are positioned on inner edges of the access doors 16 so that they abut and compress against one another when the access doors 16 are at their closed positions so as to seal against moisture infiltration between the doors. The compressible seals 100 may be formed from a compressible polymeric material that is co-molded with the access doors 16. Alternatively, the seal members 100 may be in the form of gaskets that are secured to the doors, e.g., by adhesives. While compressible seal members 100 are provided on each of the doors in the illustrated embodiment, it is conceivable that a compressible seal member could be provided on only one of the doors.

In another embodiment, the seal member 98 may be in the form of a magnetic seal member 102 carried by at least one of the doors 16. Preferably magnetic seal members 102 are carried by each of the access doors 16. The magnetic seal members may be in the form of magnetic strips that are affixed to the doors, e.g., by adhesives. The magnetic seal members 102 are positioned on the access doors 16 to magnetically engage with one another when the access doors 16 are at their closed position so as to seal against moisture infiltration between the doors. Alternatively, one of the access doors 16 can carry a magnetic seal member 102 and the other door can carry a metallic strip such that when the doors are moved to their closed position, the magnetic seal member magnetically adheres to the metal strip to seal between the access doors.

While two access doors 16 are shown, it will be appreciated that a single access door could be provided. In such a design the access door slides into abutment with a wall at its closed position. The wall defines a mating surface. A seal member, as described above, is interposed between the access door and the wall to seal against moisture infiltration when the door is moved to its closed position. The seal member can be carried by the door, the wall or both the door and the wall. Moreover, the wall can be carried by either the door mounting member or the bottom member.

Springs 104 are provided to bias the access doors 16 towards their closed positions. The springs 104 bias the access doors 16 against each other to further aid in sealing against moisture infiltration between the doors. The springs 104 are carried by recessed mounting pads 106 formed in the top face of the door mounting member 14. Each spring 104 has a pair of legs 108, 110 and a coiled portion 112. The coiled portion 112 mounts around a post 114 that extends upwardly from the recessed mounting pad 106. One of the legs 108 overlies one of the runner slots 88 of an associated access door 16. The leg 108 overlying the runner slot 88 engages with the finger 86 formed in the bottom of the access door 16 to bias the access door inwardly towards its closed position. The other leg 110 of the spring engages against a side wall of the recessed pad 106, opposite the runner slot 88. Flanges 116 overlie the recessed mounting pad 106 for further securing the spring 104 in the mounting pad 106.

A second seal member (not shown) may be interposed between the bottom member 12 and the floor. The second seal member may be in the form of at least one annular gasket which is adapted to be compressed between the floor and the mounting bracket to seal against water infiltration between the mounting bracket and the floor and into the fitting.

To assemble the cover assembly 10, the bottom member 12 is initially secured to the fitting 18 with the fasteners 46. The receptacles 24, 26 are then interconnected with the source power and communication/data cables and secured into place in the center opening 56 of the bottom member 12. The access door mounting member 14 is then positioned in the recess 74 and secured to the power receptacle 26 using the fastener 78. A means can be provided for properly orienting the door mounting member 14 within the recess 74. For example, a tab (not shown) could be formed in the recess 74 for engaging with a reciprocal slot (not shown) in the door mounting member 14. The springs 104 are then installed onto the mounting pads 106. Finally the access doors 16 are installed onto the door mounting member 14 by pushing the fingers 86 downwardly through the runner slots 88. During this step, the access doors 16 are positioned so that the fingers 86 are located laterally inward of the legs 108 of the springs 104. The bottom ends of the fingers 86 are beveled to ease their insertion into the runner slots 88. It will be appreciated that the above sequence is merely one example of the sequence in which the cover assembly components can be assembled and installed onto the fitting 18.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An access cover for a fitting of the type which adapted to be mounted is in a floor for supporting at least one receptacle such that at least one receptacle can be connected with cables which enter the fitting from below the surface of the floor and can be connected from above the floor with a connector which enters the fitting through an opening in the surface of the floor, the access cover comprising:

a door mounting member connectable to the fitting at a location that overlies the at least one receptacle;

an access door slidably connected to the access door mounting member for movement between a closed position at which door overlies the at least one receptacle and an open position at which the at least one receptacle is exposed;

a mating surface positioned to abut with the access door when the access door is moved to its closed position; and a seal member positioned to be compressed between the access door and the mating surface when the access door is moved to its closed position for sealing against moisture infiltration between the access door and the mating surface.

2. An access cover as set forth in claim 1, wherein the mating surface is defined by a second access door which is slidably mounted to the access door mounting member.

3. An access cover for a fitting of the type which adapted to be mounted is in a floor for supporting at least one receptacle, the access cover comprising:

a door mounting member connectable to the fitting at a location that overlies the at least one receptacle;

a pair of access door slidably connected to the access door mounting member for movement between closed positions at which the access doors abut one another and overlie the at least one receptacle and open positions at which the access doors are laterally spaced from one another and the at least one receptacle is exposed; and a seal member adapted to seal against moisture infiltration between the access doors when the access doors are at their closed positions.

4. An access cover as set forth in claim 3, wherein the seal member comprises at least one compressible seal carried by at least one of the access doors.

5. An access cover as set forth in claim 3, wherein the seal member comprises a pair of compressible seal members, each of the compressible seal members being carried by one of the access doors, the compressible seal members being positioned to abut one another when the access doors are at their closed positions so as to seal against moisture infiltration between the access doors.

6. An access cover as set forth in claim 5, where in the seal members comprise a compressible polymer that is co-molded with the access doors.

7. An access cover as set forth in claim 3, wherein the seal comprises a compressible polymer that is co-molded with at least one of the access doors.

8. An access cover as set forth in claim 3, wherein the seal member comprises at least one magnetic seal member.

9. An access cover as set forth in claim 8, wherein the magnetic seal member comprises first and second magnetic seal members, each of the magnetic seal members being carried by one of the access doors, the magnetic seal member being positioned to magnetically engage with one another when the access doors are at their closed position so as to seal between the access doors.

10. An access cover as set forth in claim 3, further comprising a mounting bracket interposed between the fitting and the door mounting member, the mounting bracket being adapted to support the at least one receptacle within the fitting such that the at least one receptacle can be interconnected with a source cable within the fitting and can be interconnected from above the floor with a connector.

11. An access cover as set forth in claim 10, wherein the mounting bracket includes an upwardly extending annular flange defining a water dam around the at least one receptacle.

12. An access cover as set forth in claim 11, wherein the annular flange further defines a recess for receiving the door mounting member.

13. An access cover as set forth in claim 10, wherein the mounting bracket is adapted to support at least one power receptacle.

14. An access cover as set forth in claim 10, wherein the mounting bracket is adapted to support at least one communication/data receptacle.

15. An access cover as set forth in claim 10, wherein the mounting bracket is adapted to support at least one power receptacle and at least one communication/data receptacle.

16. An access cover as set forth in claim 3, further comprising springs that are adapted to bias the access doors towards their closed positions.

17. An access cover as set forth in claim 3, further comprising locking fingers carried by the door mounting member and being adapted to retain the doors in their open positions.

18. An access cover as set forth in claim 3, wherein the access doors are configured to divert water from the cover assembly.

19. A cover assembly as set forth in claim 18, wherein the access doors are dome shaped.

20. A cover assembly for use with a fitting of the type which is disposed in a floor and has an inner compartment accessible through an opening in the upper surface of the floor, the fitting being configured so that source cables can be routed into the inner compartment from a location below the upper surface of the floor, the cover assembly comprising:

a mounting bracket connectable to the upper end of the fitting, the mounting bracket being adapted to support at least one receptacle within the fitting such that the at least one receptacle can be interconnected with a source cable within the inner compartment and can be interconnected from above the floor with a connector;

a door mounting member connected to the mounting bracket and overlying the at least one receptacle, a pair of access door slidably connected to the door mounting member for movement between inner, closed positions at which the doors abut one another and overlie the at least one receptacle and outer, open positions at which the doors are laterally spaced from one another and the at least one receptacle is exposed; and a seal member adapted to seal against moisture infiltration between the access doors when the access doors are at their closed positions.

21. An access cover as set forth in claim 20, wherein the seal member comprises at least one compressible seal carried by at least one of the access doors.

22. An access cover as set forth in claim 20, wherein the seal member comprises a pair of compressible seal members, each of the compressible seal members being carried by one of the access doors, the compressible seal members being positioned to abut one another when the access doors are at their closed positions so as to seal against moisture infiltration between the access doors.

23. An access cover as set forth in claim 22, wherein the compressible seal members comprise a compressible polymer that is co-molded with the access doors.

24. An access cover as set forth in claim 20, wherein the seal comprises a compressible polymer that is co-molded with at least one of the access doors.

25. An access cover as set forth in claim 20, wherein the seal member comprises at least one magnetic seal member carried by at least one of the access doors.

26. An access cover as set forth in claim 25, wherein the seal member comprises first and second magnetic seal members, each of the magnetic seal members being carried by one of the access doors, the magnetic seal members being positioned to magnetically engage with one another when the doors are at their closed position so as to seal between the access doors.

27. An access cover as set forth in claim 20, wherein the mounting bracket includes an upwardly extending annular flange defining a water dam around the at least one receptacle.

28. An access cover as set forth in claim 27, wherein the annular flange further defines a recess for receiving the access door mounting member.

29. An access cover as set forth in claim 20, wherein the mounting bracket is adapted to support at least one power receptacle.

30. An access cover as set forth in claim 20, wherein the mounting bracket is adapted to support at least one communication/data receptacle.

31. An access cover as set forth in claim 20, wherein the mounting bracket is adapted to support at least one power receptacle and at least one communication/data receptacle.

32. An access cover as set forth in claim 20, further comprising springs that are adapted to bias the access doors towards their closed positions.

33. An access cover as set forth in claim 20, further comprising locking fingers carried by the door mounting member and being adapted to retain the access doors in their open positions.

34. An access cover as set forth in claim 20, wherein the access doors are configured to divert water from the cover assembly.

35. A cover assembly as set forth in claim 34, wherein the access doors are dome shaped.

36. A cover assembly for use with a fitting of the type which is disposed in a floor and has an inner compartment accessible through an opening in the upper surface of the floor, the fitting being configured so that source cables can be routed into the inner compartment from a location below the upper surface of the floor, the cover assembly comprising:

a mounting bracket connectable to the fitting at a location which overlies the floor opening, the mounting bracket being adapted to support at least one receptacle within the fitting such that the at least one receptacle can be interconnected with a source cable within the inner compartment and can be interconnected from above the floor with a connector, the mounting bracket includes an upwardly extending annular flange defining a water dam around the at least one receptacle;

a door mounting member connected to the mounting bracket and overlying the at least one receptacle, a pair of access door slidably connected to the door mounting member for movement between closed positions at which the access doors overlie the at least one receptacle and open positions at which the doors are laterally spaced from one another and the at least one receptacle is exposed, each of the access door carrying a compressible seal member, the seal members being positioned to abut with one another when the access doors are at their closed positions so as to seal against moisture infiltration between the access doors.

37. An access cover as set forth in claim 36, the seal members comprise compressible seals.

38. An access cover as set forth in claim 36, where in the seals comprise a compressible polymer that is co-molded with the access doors.

39. An access cover as set forth in claim 36, wherein the annular flange further defines a recess for receiving the door mounting member.

40. An access cover as set forth in claim 36, wherein the access doors are configured to divert water from the cover assembly.

* * * * *